Dec. 19, 1961      E. E. CARLSON ET AL      3,013,881

MANUFACTURE OF DRY CHOCOLATE DRINK PRODUCT

Filed Aug. 19, 1959

INVENTORS.
EDWIN E. CARLSON
IRWIN F. PLAGGE
ARTHUR M. SWANSON
BY
*Joseph G. Werner*
ATTORNEY United States Patent Office 3,013,881
Patented Dec. 19, 1961

3,013,881
MANUFACTURE OF DRY CHOCOLATE
DRINK PRODUCT
Edwin E. Carlson, Eau Claire, Wis., Irwin F. Plagge, 679
Orleans St., Chicago, Ill., and Arthur M. Swanson,
Madison, Wis.; said Carlson and said Swanson assignors to Dairy Maid Products Cooperative, a cooperative association of Wisconsin
Filed Aug. 19, 1959, Ser. No. 834,833
23 Claims. (Cl. 99—24)

The present invention relates to the manufacture of a dry chocolate drink product and more specifically to an improved method of manufacture which results in a product that readily disperses in water and has superior flavor qualities.

The term "chocolate drink" specifically refers to a beverage product resulting from the incorporation of cocoa, sugar and vegetable stabilizer with milk that contains less than 1.5% butterfat. This fluid product is made commercially by dairies and sold in fluid form either in glass or paper milk containers.

A similar chocolate milk drink can be made in the home by mixing the dry ingredients with milk and then heating them together to get the desirable finished product. It is highly desirable to have such a product readily available in dry form so that a pleasing cold, chocolate flavored drink can be obtained by mere addition of the dry product to cold water; or, if desired, a hot chocolate drink by addition of the product to hot water. One method for the manufacture of a powdered chocolate product has been described by Peebles and Clary in U.S. Patent 2,850,388.

The present invention pertains to improved methods for the production of a dry chocolate product. For the purpose of the present invention, the finished product will be referred to as a "dry chocolate drink."

It is an object of the present invention to provide an improved process for manufacture of a dry chocolate drink that not only has the desirable characteristics of readily mixing with either cold or hot water, but will also result in a chocolate drink of superior flavor qualities.

Another object of this invention is to provide a novel method for producing a product of the above characteristics which will retain these desirable characteristics over an extended storage life.

A further object of this invention is to provide a process for the manufacture of a dry chocolate drink which hastens the drying of the final product to minimize lactose crystallization during such drying so as to lessen flavor change during drying and produce greater stability of this product.

It is an additional object of this invention to provide a process for the manufacture of a dried chocolate drink which will avoid drying of a cocoa base, thereby reducing the cost and labor involved.

Other objects and advantages will be apparent from the detailed description taken in conjunction with the accompanying drawings.

Pursuant to our process, a nonfat milk solids base product, with or without sugar (sucrose) is made in the following manner: When sucrose i.e., either cane or beet sugar, is used, it is added to fluid skim milk in such quantities that when the liquid is reduced by spray drying, 60% or more of the total solids are nonfat dry milk solids and up to 40% of the total solids are sucrose. When used, the sucrose is added to the milk in a vat and agitated to dissolve the sugar as shown in step 1 of FIG. 1. Heat is normally applied to facilitate the dissolving and mixing the sugar in the fluid skim milk.

Figure 1:
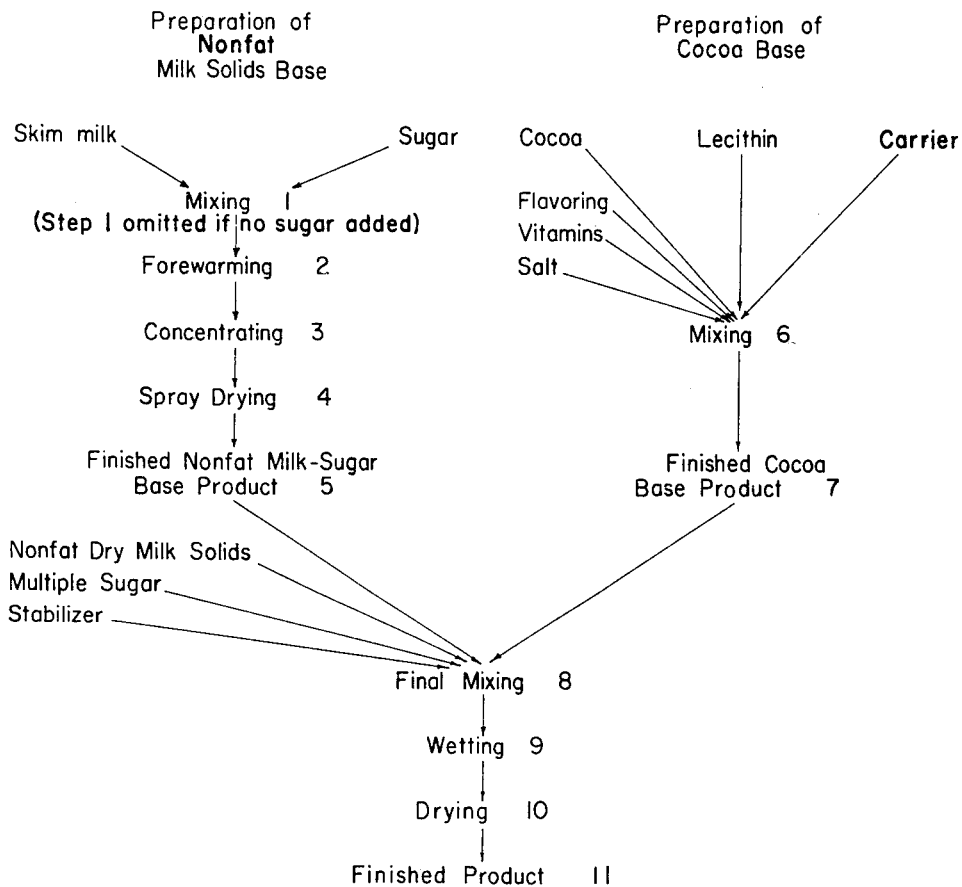
FIG. 1 is a flow diagram illustrating a procedure for our dry chocolate drink.

The liquid skim milk product, with or without sugar, is then forewarmed by either heating in the vat or passing through a heat exchanger to bring the mixture to about 170° F. to 190° F. and held at this temperature for approximately 30 minutes as shown in step 2 in FIG. 1. Other periods of time and temperature may be used for such forewarming step, but it is considered necessary that the temperature and the period for maintaining such temperature be of such intensity and duration as to insure substantially the same results as those obtained when the temperature is maintained at about 170° F. to 190° F. for approximately 30 minutes.

After such forewarming, the liquid skim milk product, with or without sugar, is concentrated in an evaporator which may be with a single, double or triple effect evaporator, or a double effect evaporator with a thermo-compression unit as indicated at step 3 of FIG. 1. The mixture is concentrated to a range of about 35% to 45% total solids. The temperature of the concentrate leaving the last effect of the evaporator is about 105° F. to 130° F.

The concentrate is then spray dried in a conventional spray drier (see step 4 in FIG. 1) to produce the nonfat milk solids base product with or without sugar, at step 5 of FIG. 1. It is preferable to spray the concentrate without applying additional heat as it is transferred from the evaporator; however, the concentrate may be momentarily heated up to about 160° F. before spraying. The spray drier is so operated that the finished nonfat milk solids base product is not caramelized and has a moisture content of about 3% to 4%.

A cocoa base product is made in the following manner: Natural or alkali processed cocoas (commonly known as "Dutch" or "Dutch-type" cocoas) are mixed with a small amount of vegetable lecithin and a vegetable oil carrier. The lecithin constitutes a wetting agent for the cocoa to permit the cocoa particles to wet more readily when brought in contact with water. Typically, the constituents by weight are cocoa, about 90%; vegetable oil carrier, 5% to 9%; and vegetable lecithin 1% to 5%. The mixing step of the product constituting the cocoa base is shown at step 6 of FIG. 1 and the finished cocoa base product shown at step 7 of FIG. 1.

The cocoa base product and the nonfat milk solids base product are then dry mixed with other ingredients to make the final blend. Such other ingredients are multiple type sugar, having 5% to 10% invert sugar therein, preferably about 6%, vegetable stabilizer, and preferably nonfat dry milk when the nonfat milk solids base product has sugar added. The dry mixing of step 8 in FIG. 1 is preferably accomplished in a ribbon blender. The final blend of such ingredients typically has the following composition by weight:

|  | With sugar in nonfat milk solids base product | Without sugar in nonfat milk solids base product |
|---|---|---|
|  | Percent | Percent |
| Nonfat milk solids base product | 62 to 72 | 45 to 55 |
| Cocoa base product | 10 to 15 | 10 to 15 |
| Nonfat dry milk | 2 to 15 |  |
| Multiple type sugar | 13 to 18 | 31 to 36 |
| Stabilizer | 0.5 to 1.5 | 0.5 to 1.5 |

"Multiple type sugar," as used herein, are defined as mixtures of common sugars, sucrose, dextrose, lactose, invert and so forth, prepared in a dry essentially amorphous form, as presently produced by Refined Syrups, Inc. of Yonkers, New York.

The dry blend is then treated in the apparatus shown in

Figure 2:
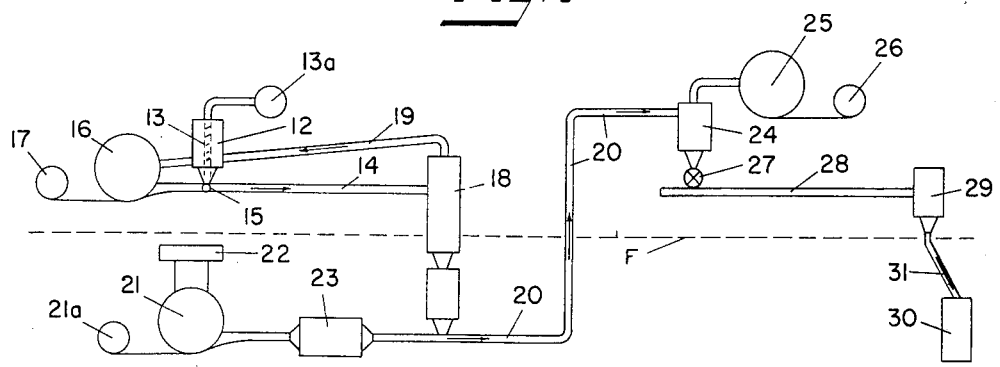
FIG. 2 is a schematic diagram partially in section illustrating one apparatus by which our method may be practiced.

FIG. 2. It is placed in the supply hopper 12 which is fed into the wetting tube or chamber 14 by means of feed screw 13 operated by motor 13a. The dry blend is exposed to an atmosphere of moist steam entering at pipe 15. The blended product and wet steam is kept in constant motion through the wetting tube 14 by means of high velocity fan 16 operated by motor 17, which blows the product into wet cyclone 18. Fan 16 has air return 19. During the passage of the product through the wetting tube 14 the surfaces of the dry particles become wet and tacky. As particles come in contact with one another, the surfaces of the particles adhere to each other forming aggregates of a number of particles attached to one another, which aggregates are substantially larger than the individual particles. Control of the temperature in wetting tube or chamber 14 is extremely important, ranging between about 165° F. and 185° F., the optimum temperatures depending upon the air velocity and the composition of the product being treated. The moisture content of the product after having been properly wetted in wetting tube or chamber 14 is about 6% to 12% total moisture.

The agglomerates form clusters, and after being forced from wetting tube 14 they pass through wet cyclone 18. The clusters then drop from cyclone 18 into the redrying section 20, where the clusters are subjected to high velocity warm air from fan 21 operated by motor 21a and having filters 22 and heating coil 23 which heats the air. In the redrying section 20, the clusters of agglomerates are subjected to drying air at temperatures ranging between about 265° F. and 290° F. The clusters of particles begin to dry immediately as the product moves through the redrying section 20. The product is forced into tube 24 where it is subjected to forced air from fan 25 operated by motor 26. The product is separated from the driving air stream as it is forced from tube 24 through star valve 27. The product is substantially dried when it is deposited on the shaker table 28, though final drying to the preferred 2.4% to 4.0% moisture content is accomplished before it reaches the end of shaker table 28. The particles are sized by means of sizing rolls 29 and then placed in drum 30 through tube 31 for final packaging. The floor line between upper and lower levels of the plant is indicated by F in FIG. 2.

The lapse of time from the entry of the product into wetting tube or chamber 14 until it leaves tube 24 through star valve 27 ranges between about 8 to 20 seconds. The period of time from the time the clusters are placed upon the shaker drying table 28 until dried ranges between 30 and 40 seconds. The complete wetting, agglomeration and drying steps are accomplished within one minute or less. The moisture content of the finished dry chocolate drink is preferably 2.4% to 4.0%.

We have learned that the following novel features of our invention produce a finished dry chocolate drink with superior flavor and keeping quality in addition to excellent disperseability:

(a) The temperature of the forewarming of the liquid skim milk product (step 2, FIG. 1) is of importance in forming larger, more uniform and more distinct aggregates, making the finished product more wettable. The temperature of the forewarming treatment also provides a more pleasing flavor and substantially lengthens the shelf life of the product. The forewarming treatment may well be expressed in terms of milligrams of whey protein per gram of nonfat dry milk as determined by the Harland-Ashworth Procedure described in Food Research, vol. 12, pages 247–251 (1947). We have determined that the whey protein values should be between about 1.0 to 2.5 mgs. per gram of nonfat dry milk solids in the nonfat milk solids base product. A typical forewarming temperature is 185° F. for 30 minutes, or the equivalent thereof as hereinabove described.

(b) The incorporation of a multiple type sugar, containing 5% to 10% invert type sugars is an important contributing factor for obtaining a less fragile and better particle size formation in the finished product, and for making the finished product quickly soluble in water. The invert multiple type sugar makes possible the agglomeration of the product with a minimum of moisture and at lower temperatures than are normally applied, thereby minimizing the danger of caramelization and/or flavor change in the final product.

(c) The rapid rate of wetting and drying as described above which takes place within one minute or less permits a minimum amount, if any, of lactose crystallization during the drying step. It is believed that because of the brief period of exposure of the product to moisture there is practically no flavor change during such processing and the product maintains maximum stability on storage.

(d) We have further discovered that the drying of a nonfat milk solids base product with or without sugar, shown at step 4, FIG. 1, and the subsequent dry blending of a cocoa base and sugar eliminates the drying of a cocoa-sugar-milk base as taught by the prior art; for example, Peebles and Clary in U.S. Patent No. 2,850,388, show drying of such a mixture by drum type drying equipment or spray drying. In particular, the spray drying of a cocoa base would necessitate additional labor and expense because of the difficulty of the cleaning operation of a spray dryer when cocoa is so dried.

We claim:

1. In a process for the manufacture of a dry chocolate drink product, mixing fluid skim milk and sucrose, controlled forewarming of such mixture to produce whey protein values of about 1.0 to 2.5 mgs. per gram of nonfat dry milk in the resultant nonfat milk solids base product, concentrating the mixture and drying the same to form said nonfat milk solids base product, mixing dry cocoa with a wetting agent for cocoa to form a cocoa base product, blending the nonfat milk solids base product and the cocoa base product with nonfat dry milk, multiple type sugar and a stabilizer, subjecting the blended particles to controlled wetting while being subject to heated high velocity air flow to cause particles to adhere to each other in aggregated form and rapidly drying such aggregated particles.

2. The process of claim 1 wherein the wetting agent for cocoa is lecithin.

3. The process of claim 2 in which a carrier for the lecithin is added to the cocoa base before it is blended with the other specified materials.

4. In a process for the manufacture of a dry chocolate drink product, controlled forewarming of fluid skim milk to produce whey protein values of about 1.0 to 2.5 mgs. per gram of nonfat dry milk in the resultant nonfat milk solids base product, concentrating the skim milk and drying the same to form said nonfat milk solids base product, mixing dry cocoa with a wetting agent for cocoa to form a cocoa base product, blending the nonfat milk solids base product and the cocoa base product with multiple type sugar and a stabilizer, subjecting the blended particles to controlled wetting while being subject to heated high velocity air flow to cause particles to adhere to each other in aggregated form and rapidly drying such aggregated particles.

5. The process of claim 4 wherein the wetting agent for cocoa is lecithin.

6. The process of claim 5 in which a carrier for the lecithin is added to the cocoa base before it is blended with the other specified materials.

7. In a process for the manufacture of a dry chocolate drink product, mixing fluid skim milk and sucrose, controlled forewarming of such mixture to produce whey protein values of about 1.0 to 2.5 mgs. per gram of nonfat dry milk in the resultant nonfat milk solids base product, concentrating the mixture and drying the same to form said nonfat milk solids base product, mixing dry cocoa with a wetting agent for cocoa to form a cocoa base product, blending the nonfat dry milk solids base product and the cocoa base product with multiple type sugar and a stabilizer, subjecting the blended particles to controlled wetting while being subject to heated high velocity air flow to cause particles to adhere to each other in aggregated form and rapidly drying such aggregated particles.

8. In a process for the manufacture of a dry chocolate drink product, mixing fluid skim milk and sucrose, heating such mixture to the equivalent of about 170° F. to 190° F. for 30 minutes, then concentrating the mixture and drying the same to form a nonfat milk solids base product, mixing dry cocoa with a wetting agent to form a cocoa base product, blending the nonfat milk solids base product and the cocoa base product with nonfat dry milk, multiple type sugar and a stabilizer, subjecting the blended particles to controlled wetting while being subject to heated high velocity air flow to cause particles to adhere to each other in aggregated form, and rapidly drying such aggregated particles.

9. The process of claim 8 wherein the multiple type sugar contains approximately 5% to 10% invert type sugar.

10. The process of claim 8 in which flavoring is added to the cocoa base product before it is blended with the other specified materials.

11. In a process for the manufacture of a dry chocolate drink product, heating fluid skim milk to the equivalent of about 170° F. to 190° F. for 30 minutes, then concentrating the skim milk and drying the same to form a nonfat milk solids base product, mixing dry cocoa with a wetting agent to form a cocoa base product, blending the nonfat milk solids base product and the cocoa base product with multiple type sugar containing invert type sugar and a stabilizer, subjecting the blended particles to controlled wetting while being subject to heated high velocity air flow to cause particles to adhere to each other in aggregated form, and rapidly drying such aggregated particles.

12. In a process for the manufacture of a dry chocolate drink product, mixing fluid skim milk and sucrose, heating such mixture to the equivalent of about 170° F. to 190° F. for 30 minutes, then concentrating the mixture and drying the same to form a nonfat milk solids base product, mixing dry cocoa with a wetting agent to form a cocoa base product, blending the nonfat milk solids base product and the cocoa base product with multiple type sugar containing invert type sugar and a stabilizer, subjecting the blended particles to controlled wetting while being subject to heated high velocity air flow to cause particles to adhere to each other in aggregated form, and rapidly drying such aggregated particles.

13. The method for manufacturing a dry chocolate drink product having the steps of mixing fluid skim milk and sucrose, then heating such mixture to the equivalent of about 170° F. to 190° F. for 30 minutes, then concentrating the mixture to a total solids concentrate of about 35% to 45% at a temperature of about 105° F. to 130° F., spray drying the concentrate to form a nonfat milk solids base product, mixing dry cocoa with lecithin to form a cocoa base product, blending the nonfat milk solids base product and the cocoa base product with nonfat dry milk, multiple type sugar containing invert type sugar and a stabilizer, subjecting the blended particles to controlled wetting in a chamber having a temperature between about 165° F. and 185° F. and a high velocity flow of air therethrough to cause particles to adhere to each other in aggregated form, and rapidly drying such aggregated particles.

14. The method for manufacturing a dry chocolate drink product having the steps of heating fluid skim milk to the equivalent of about 170° F. to 190° F. for 30 minutes, then concentrating the skim milk to a total solids concentrate of about 35% to 45% at a temperature of about 105° F. to 130° F., spray drying the concentrate to form a nonfat milk solids base product, mixing dry cocoa with lecithin to form a cocoa base product, blending the nonfat milk solids base product and the cocoa base product with multiple type sugar containing invert type sugar and a stabilizer, subjecting the blended particles to controlled wetting in a chamber having a temperature between about 165° F. and 185° F. and a high velocity flow of air therethrough to cause particles to adhere to each other in aggregated form, and rapidly drying such aggregated particles.

15. The method for manufacturing a dry chocolate drink product having the steps of mixing fluid skim milk and sucrose, then heating such mixture to the equivalent of about 170° F. to 190° F. for 30 minutes, then concentrating the mixture at a temperature of about 105° F. to 130° F., spray drying the concentrate without substantially increasing the temperature to form a nonfat solids base product, mixing dry cocoa and lecithin to form a cocoa base product, blending the nonfat solids base product and the cocoa base product with nonfat dry milk, multiple type sugar containing invert type sugar and a stabilizer, subjecting the blended particles to wetting of between about 6% and 12% total moisture in a chamber having a high velocity flow of heated air therethrough to cause particles to adhere to each other in aggregated form and rapidly drying such aggregated particles with a total moisture in the finished product ranging from about 2.4% to 4.0%.

16. The method of claim 15 wherein the drying of said aggregated particles is accomplished within approximately one minute from the time the blended particles are subjected to wetting.

17. The method for manufacturing a dry chocolate drink product having the steps of heating fluid skim milk to the equivalent of about 170° F. to 190° F. for 30 minutes, then concentrating the skim milk at a temperature of about 105° F. to 130° F., spray drying the concentrate without substantially increasing the temperature to form a nonfat solids base product, mixing dry cocoa and lecithin to form a cocoa base product, blending the nonfat solids base product and the cocoa base product with multiple type sugar containing invert type sugar and a stabilizer, subjecting the blended particles to wetting of between about 6% to 12% total moisture in a chamber having a high velocity flow of heated air therethrough to cause particles to adhere to each other in aggregated form and rapidly drying such aggregated particles with a total moisture in the finished product ranging from about 2.4% to 4.0%.

18. A process for manufacturing a dry chocolate drink product comprising the steps of mixing fluid skim milk and sucrose in such quantities that when the mixture is subsequently dried at least 60% of the total solids are nonfat dry milk solids and up to 40% of the total solids are sucrose, heating such mixture to the equivalent of about 170° F. to 190° F. for 30 minutes, then concentrating the mixture and drying the concentrate to form a nonfat milk solids base product, mixing dry cocoa with lecithin to form a cocoa base product, blending the nonfat milk solids base product and the cocoa base product with nonfat dry milk, multiple type sugar containing 5% to 10% invert type sugar and a stabilizer so that the blend typically has approximately the following composition by weight:

| | Percent |
|---|---|
| Nonfat milk solids base product | 62 to 72 |
| Cocoa base product | 10 to 15 |
| Nonfat dry milk | 2 to 15 |
| Multiple type sugar | 13 to 18 |
| Stabilizer | 0.5 to 1.5 | subjecting the blended particles to controlled wetting while being subjected to heated high velocity air flow to cause particles to adhere to each other in aggregated form, and rapidly drying such aggregated particles.

19. A process for manufacturing a dry chocolate drink product comprising the steps of heating fluid skim milk to the equivalent of about 170° F. to 190° F. for 30 minutes, then concentrating the skim milk and drying the concentrate to form a nonfat milk solids base product, mixing dry cocoa with lecithin to form a cocoa base product, blending the nonfat milk solids base product and the cocoa base product with multiple type sugar containing 5% to 10% invert type sugar and a stabilizer so that the blend typically has approximately the following composition by weight:

|  | Percent |
|---|---|
| Nonfat bilk solids base product | 45 to 55 |
| Cocoa base product | 10 to 15 |
| Multiple type sugar | 31 to 36 |
| Stabilizer | 0.5 to 1.5 | subjecting the blended particles to controlled wetting while being subjected to heated high velocity air flow to cause particles to adhere to each other in aggregated form, and rapidly drying such aggregated particles.

20. The process of claim 1 wherein the drying of said aggregated particles is accomplished within approximately one minute from the time the blended particles are subjected to wetting.

21. The process of claim 4 wherein the drying of said aggregated particles is accomplished within approximately one minute from the time the blended particles are subjected to wetting.

22. A dry chocolate drink product containing nonfat dry milk solids, multiple type sugar with invert type sugar, lecithinated cocoa, and a stabilizer.

23. The product of claim 22 wherein the whey protein values in a substantial portion of the nonfat dry milk solids is between about 1.0 and 2.5 mgs. per gram of nonfat dry milk solids.

References Cited in the file of this patent

UNITED STATES PATENTS

| 2,392,401 | North | Jan. 8, 1946 |
| 2,399,565 | North | Apr. 30, 1946 |
| 2,659,676 | Howard | Nov. 17, 1953 |
| 2,832,686 | Lowder | Apr. 29, 1958 |
| 2,835,586 | Peebles | May 20, 1958 |
| 2,850,388 | Peebles et al. | Sept. 2, 1958 |
| 2,893,871 | Griffin | July 7, 1959 |
| 2,900,256 | Scott | Aug. 18, 1959 |
| 2,911,300 | Peebles | Nov. 3, 1959 |